April 17, 1934.　　　　Z. LITTMAN　　　　1,955,507

SUPPORTING AND STABILIZING MECHANISM

Original Filed Dec. 21, 1929　　8 Sheets-Sheet 1

INVENTOR
Zeno Littman
BY
Frank A. Cent
ATTORNEY

April 17, 1934.　　　Z. LITTMAN　　　1,955,507
SUPPORTING AND STABILIZING MECHANISM

Original Filed Dec. 21, 1929　　8 Sheets-Sheet 2

April 17, 1934.  Z. LITTMAN  1,955,507
SUPPORTING AND STABILIZING MECHANISM
Original Filed Dec. 21, 1929    8 Sheets-Sheet 6

April 17, 1934.    Z. LITTMAN    1,955,507
SUPPORTING AND STABILIZING MECHANISM
Original Filed Dec. 21, 1929    8 Sheets-Sheet 7

April 17, 1934.　　　　Z. LITTMAN　　　　1,955,507

SUPPORTING AND STABILIZING MECHANISM

Original Filed Dec. 21, 1929　　8 Sheets-Sheet 8

INVENTOR
Zeno Littman
BY
Frank V. Kent
ATTORNEY

Patented Apr. 17, 1934

1,955,507

UNITED STATES PATENT OFFICE 1,955,507

SUPPORTING AND STABILIZING MECHANISM

Zeno Littman, New York, N. Y.

Application December 21, 1929, Serial No. 415,671
Renewed August 18, 1933

17 Claims. (Cl. 280—104)

My invention relates to supporting, equalizing and stabilizing mechanism having in its broader aspect a great variety of practical applications, including the equalization or stabilization of elastically supported or floating structures.

In the present embodiment it is adapted for the support or "suspension" of a motor-vehicle body, or chassis frame. In this embodiment or adaptation the principal features, objects, or advantages of the invention include:

The support of the frame upon the axles in such manner that the frame or body is practically stabilized against lateral or longitudinal tilting or pitching, and especially such tilting or pitching motions as are ordinarily caused by the rise of only one wheel at a time, and which cause the greatest discomfort to passengers. Such supporting means or arrangement includes one or more transverse or longitudinal equalizers, which in effect reduce the "motion" applied to the chassis when one wheel rises; and also auxiliary or supplemental spring supporting means, intermediate the main springs and the chassis, which greatly reduce the lift of the chassis when two wheels (as, both front, or both rear, wheels) are thrown upward at the same time. In addition to the equalizing means I preferably provide stabilizing means which definitely controls or maintains the horizontal position of the chassis when one wheel only is thrown upward. This supporting or "suspension" mechanism eliminates the necessity for "shock absorbers", and also nearly or entirely eliminates strains which ordinarily cause chassis-frame distortion (or twisting), thus directly reducing body-distortion, noises, etc., and indirectly further reducing such disadvantages and permitting simplification and economy in the body structure, by enabling the use of a practically rigid frame. The equalizing mechanism includes, when desired, means for reducing longitudinal pitching or tilting by causing the rear end of the chassis to be elevated to practically the same extent as the front end, when the front is raised by a considerable simultaneous "lift" of the front wheels, and vice versa. The equalizing mechanism also acts under practically all possible conditions to apply substantially equal portions of the chassis weight to both front wheels and to both rear wheels, thus tending to keep the wheels always in contact with the road surface and with equal pressure, thus reducing tire wear, and tendency to skidding, and increasing the efficiency of braking, whether brakes are on all wheels or rear wheels only.

The mechanism also provides means for definitely preventing rapid lateral oscillation or dancing of the car body which in the case of ordinary spring suspensions frequently occurs when driving at certain speeds over wavy road surfaces which cause only one wheel at a time at the front or rear of the car, or especially one rear wheel, to vibrate vertically, the dancing effect being due to spring elongation and a horizontal component of forces thereby applied to the chassis frame. To prevent this side sway or dancing, I preferably suspend the chassis frame on the rear springs at both ends thereof on shackle links, so that spring elongation cannot apply any longitudinal forces to the frame, and provide cooperating mechanism for stabilizing the frame in relation to the axle to prevent relative longitudinal movement thereof.

As an important feature of the stabilizing (as distinguished from the equalizing) mechanism, I provide means acting independently between each end of an axle (preferably the rear axle) and the frame, by which when either end of the axle is raised, the distance between the axle end and the frame is regulated as a consequence of such axle movement, in such manner that the frame is maintained in horizontal position (that is, parallel to normal or untilted position of the axle).

The characteristics and advantages of the invention are further sufficiently explained in connection with the following detail description of the accompanying drawings, which shows one representative embodiment. After considering this example, skilled persons will understand that many variations may be made without departing from the principles disclosed and I contemplate the employment of any structures that are properly within the scope of the appended claims.

The main chassis frame comprises side members 25 of channel section and various cross members referred to later. The front axle 26 of special construction, and the rear axle 27 may be in the usual locations in relation to the frame and body. The rear axle may be of any ordinary or suitable construction except for details to be mentioned. The main or chassis supporting front springs 28 and rear springs 29 may be as usual except for their mounting or connections to the frame and other parts. The type of the springs may vary. As shown, they are of half-elliptical or approximately flat form in conformity with present general practice. The front wheels 30 with or without brake mechanism and rear wheels 31 with their brakes may be as usual, and in general, the invention structure does not interfere with normal chassis form or arrangement including power plant, transmission gearing, controls and body mounting. In other words, the entire car design may be as usual except for modifications or rearrangements of chassis parts to provide the present improved supporting, equalizing and stabilizing functions.

Figure 1:
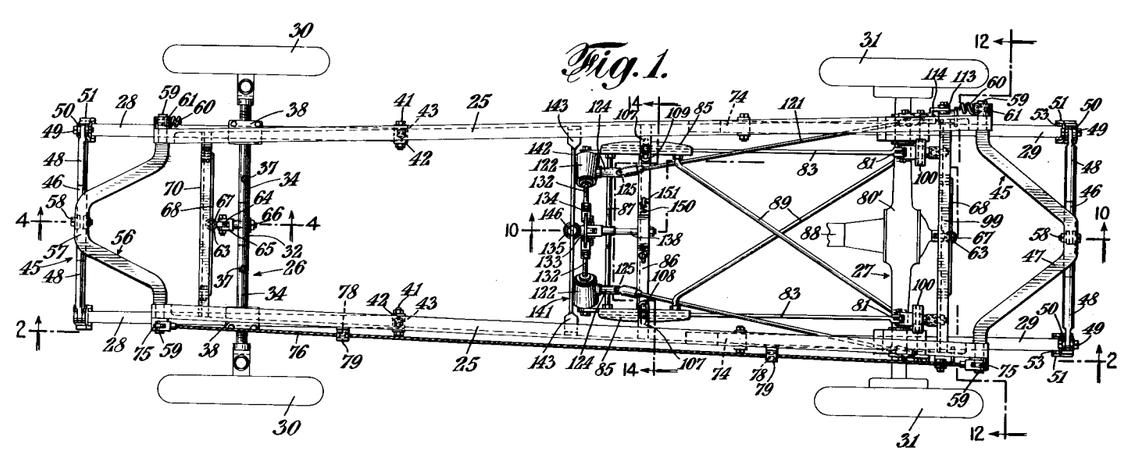
Fig. 1 is a plan view of an automobile chassis, embodying the invention in one form.
Figure 2:
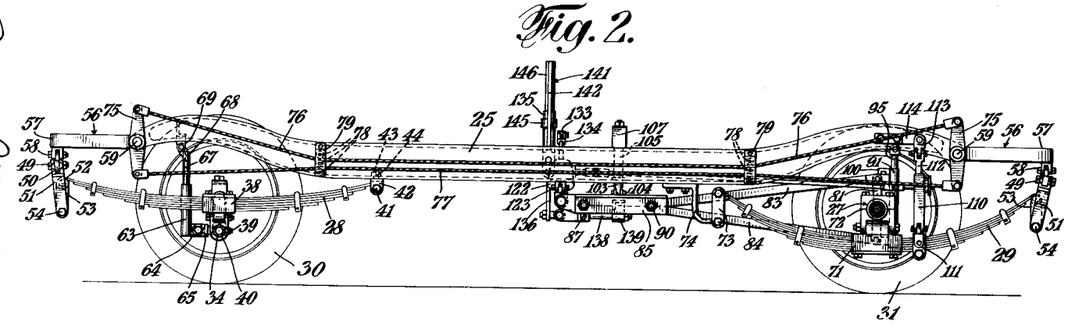
Fig. 2 is a vertical section at 2—2, Fig. 1, the view being in elevation except for omission of the left wheels and axle ends.
Figure 3:
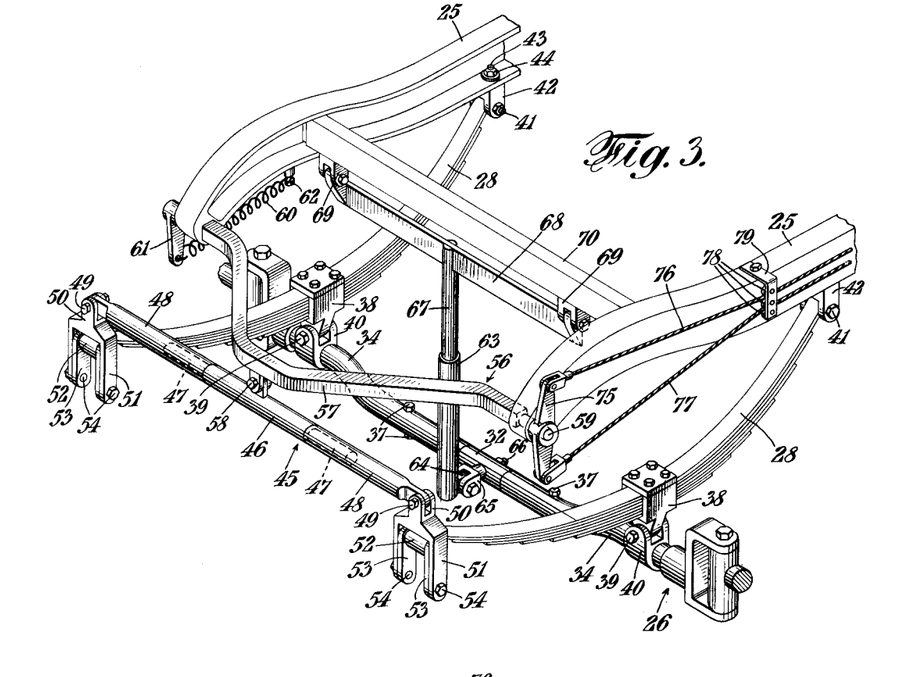
Fig. 3 is a perspective of the front of the chassis from a left front viewpoint.
Figures 4, 6:
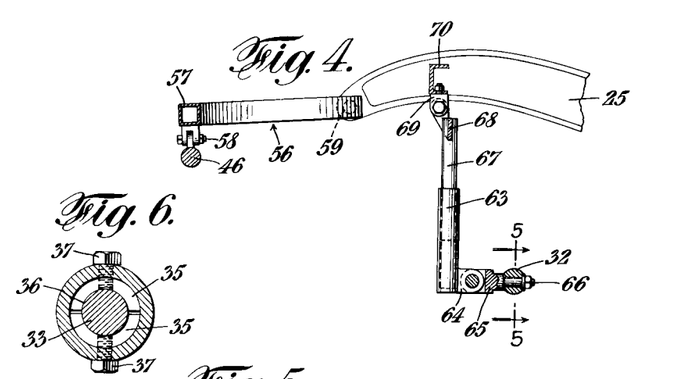
Fig. 4 is a section at 4—4, Fig. 1, enlarged.
Fig. 6 is a section at 6—6, Fig. 5, enlarged.
Figure 5:
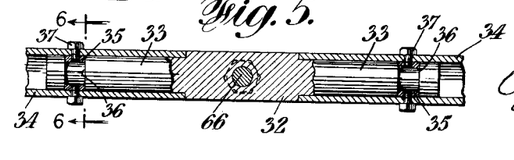
Fig. 5 is a section at 5—5, Fig. 4, enlarged.
Figure 7:
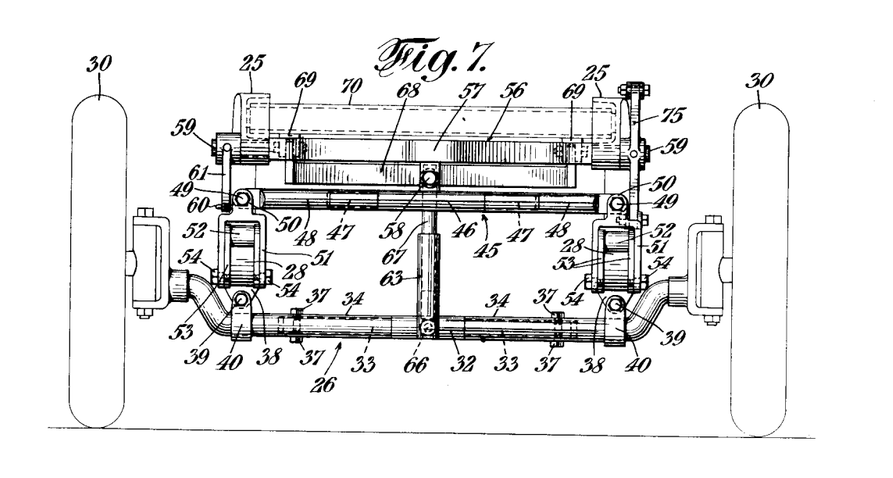
Fig. 7 is a front elevation.

The front axle 26 is preferably of generally tubular form. It includes a center section 32 having cylindrical extensions 33, and end sections 34 telescoping over the extensions, with collars or half-bearing rings 35 (Figs. 5 and 6) engaging in annular channels 36 in extensions 33 and secured to the end sections as by cap screws 37. The central portions of the front springs are clamped in spring seats 38 and these are mounted on longitudinal pivot pins 39 in brackets 40 on the axle end sections 34 near the outer ends thereof. This pivotal mounting of the springs on longitudinal axes permits the springs to remain in normal vertical position when the axle tilts (Fig. 8) and prevents any twisting or torsional forces being applied to the spring. Preferably, the front springs are mounted at their rear ends at fixed points on the main frame. Thus, as shown, the rear spring eyes are mounted on spring bolts 41 passing through forked lugs 42. These lugs may be fixed in the frame side members, since in most cases there is no appreciable pivotal movement of the springs in a generally horizontal plane in relation to their rear connection; but to provide for any slight pivotal movement, the supporting lugs or brackets 42 may be pivotally mounted as by providing them with stems 43 passing through the lower frame flanges and secured by nuts 44.

By the described arrangement, driving and braking forces acting between the chassis and the front axle are transferred directly through the rear halves of the springs 28 and their connections at fixed pivot points to the frame.

Figure 8:
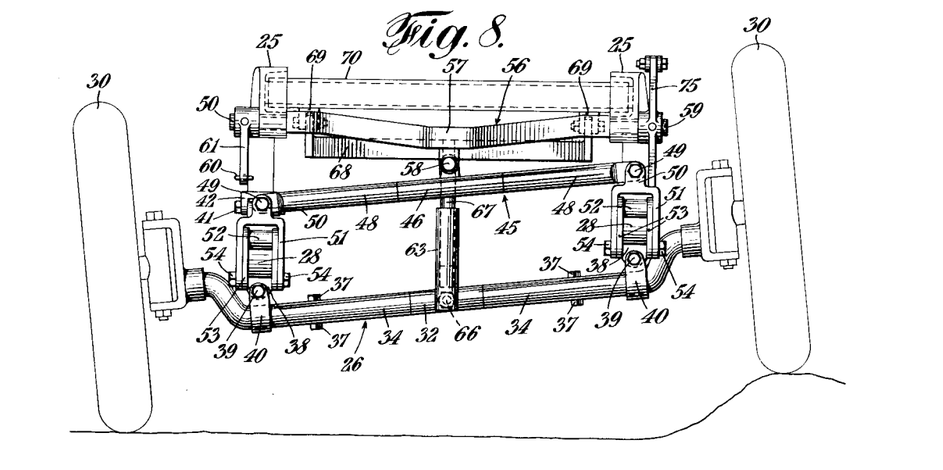
Fig. 8 is a similar view of the parts in another position.

At their front ends, the front springs are connected to a transverse equalizing bar 45, which may be structurally similar to the front axle; that is, it includes a center section 46 with extensions 47 and end sections 48 revolubly mounted on the extensions. It is unnecessary in some cases to provide means preventing relative longitudinal movement of the center and end sections but if necessary or desirable such movement may be prevented by means similar to the half bearings or collars 35, and annular channels with which they cooperate, of the front axle, as above described. At their outer ends, the bar sections 48 are mounted on pivot pins or bolts 49 in clevises 50 at the tops of shackle forks 51. The pivot mountings 49 are arranged longitudinally of the chassis. The shackle bolt or pin passing through each front spring eye 52 is connected to the upper ends of shackle links 53, which are pivotally connected at 54 to the lower ends of the fork arms, these pivotal connections being transverse to the chassis, or parallel to the equalizing bar. The equalizing bar is thus connected in an under-slung relation to the front ends of the springs, providing for stable support of the front end of the frame upon the springs in any position of the axle. The longitudinal pivot connections 49 prevent the application of any torsional forces and allow the springs to remain in normal, upright position when the axle is tilted (Fig. 8). The shackle links 53 supporting the spring ends in the shackle forks 51 permit elongation of the spring as it is flattened and consequent movement of the front ends of the spring in relation to the shackle forks and equalizing bar without imposing any strains thereon.

The front end of the chassis frame is supported on the equalizing bar by a transverse shaft 56, called for convenient identification a spring shaft, or auxiliary spring shaft. This may be of hollow, rectangular section, as shown, and has its central portion 57 bowed, so that it projects forward and is pivotally connected at 58 to the center section of the equalizing bar, the pivot axis being longitudinal of the chassis. The ends 59 of the spring shaft are mounted for oscillation in bearings in the front ends of the frame side members 25. Normally, the forward or bowed portion of the spring shaft is urged downward to properly support the chassis frame on the equalizing bar by a heavy tension spring 60 acting between an arm 61 on one end of the shaft and a stud 62 on the corresponding frame member. Except for the auxiliary cushioning function of shaft 56 and a further function in cooperation with a similar rear shaft in longitudinally stabilizing the chassis frame, the spring shaft may be considered as rigidly mounted at the front end of the frame.

Lateral movement of the front end of the frame in relation to the axle in any position of the latter is prevented by lateral supporting or guide means including a guide sleeve 63 which has at its end a lug 64 pivotally mounted in a lug 65 which in turn has an oscillating or swivel mounting consisting of the pin 66 revolubly mounted in the center section of the axle. A guide rod 67 reciprocates in the guide sleeve and is rigidly connected at its upper end to a cross-bar 68, the rod and bar forming what may be conveniently identified as a T-guide structure. The ends of the bar are pivotally mounted in lugs 69 connected to a frame cross member 70. By the described arrangement, the T-guide is free to swing in relation to the frame on a transverse axis and the guide sleeve 63 is free to move in relation to the axle on both transverse and longitudinal axes. This articulation provides for any possible movements of the axle such as tilting in the vertical plane or for longitudinal movement due to spring elongation but at the same time the rigid T-guide structure having a long sliding bearing in the guide sleeve prevents any horizontal lateral movement of the frame in relation to the axle, or in other words, prevents side sway of the frame.

Generally similar equalizing, lateral stabilizing and auxiliary spring supporting mechanism is provided at the rear of the chassis, Figs. 9 to 13, with slight modifications or re-arrangements as presently referred to. The rear springs 29 at their centers are swung below the rear axle, being clamped in spring seats or boxes 71 which are pivotally mounted on longitudinal axes in the lower ends of blocks 72 which are mounted to oscillate upon the axle sleeve. These double articulated spring supports permit the springs to remain in normal upright position regardless of axle tilting, as in the case of the front springs. In one preferred arrangement, as shown in these figures, the front ends of the rear springs are connected by swinging shackles 73 to brackets 74 carried by the frame side members, so that elongation of the front halves of the springs exerts no longitudinal thrust on the chassis. The rear ends of the rear springs are connected to a rear equalizing bar and that is connected to a rear auxiliary spring shaft, as in the case of the front axle, the parts being similarly numbered. It will be noted that the spring 60 to maintain the rear auxiliary spring shaft 56 in normal position is at the same side of the chassis as the similar front spring. In some cases, one of these springs may be omitted; but when a spring is provided for each auxiliary spring-shaft they are mounted on the same side of the chassis, providing for the interconnection of the two spring shafts at the other side of the chassis only, as follows:—

On the end of each spring shaft at the same side of the chassis (as shown, the left side) is a two-armed lever 75, and the upper arms of the two levers are connected by a link or cable 76 and similarly the lower arms of the two levers are connected by a link or cable 77, these cables being suitably guided along adjacent chassis side frame member as by pulleys 78 carried by supports or brackets 79. By this interconnection of the spring shafts, when either one of them is oscillated in relation to the main frame by a severe road shock, sufficient to stretch either of the springs 60, the cable connections cause the other shaft to be oscillated to the same extent, but in the opposite vertical direction. For example, if either or both ends of the front axle are raised by reason of the wheel or wheels encountering an abrupt obstacle in the road, the force applied to the auxiliary spring shaft through the equalizing bar 45 will cause the shaft to oscillate upward with accompanying stretching of its spring 60; the lower cable 77 acting on the rear spring shaft will cause it to oscillate downward, thus raising the rear end of the chassis by action upon the rear equalizing bar which is supported by the rear ends of the rear springs. The auxiliary spring mechanism therefore, in addition to relieving the main springs in case of severe shocks, produces substantial longitudinal stabilization of the chassis frame.

The rear lateral stabilizing or guide structure including the T-guide 63, 67, 68, etc., is the same as at the front, except that the swivel lug supporting the guide sleeve 63 is revolubly mounted in a socket 80 at the rear of the differential housing 81.

Associated with the rear axle is an axle frame extending forward to a point near the longitudinal center of the chassis. This frame includes at each side vertical arms or struts 81 and 82 extending upward and downward from the axle sleeve and rigidly connected thereto by welding or otherwise. At the ends of these arms are connected upper and lower longitudinal bars 83, 84 which converge in the forward direction and are connected together to a side member 85. The two side members are connected by suitable transverse members including in the present specific example a cross bar 86 and a rod 87, these being curved downward at the center to provide clearance for the propeller shaft 88 or shaft housing. The axle frame may be additionally braced by diagonal rods 89 each of which is connected at 90 to one of the side members 85 and at the other end to one of the lower struts 82. The entire axle frame is substantially rigid and is guided in relation to the frame in such manner that whenever one end of the axle moves upward, the front end of the axle frame at the same side moves upward to a corresponding degree, and at the same time the frame is guided in relation to it by sleeves 91 pivotally connected on longitudinal axes 92 to yokes 93 which are pivotally connected on transverse axes 94 to the lower axle arms or struts 82. In each of the sleeves 91 a guide bar 95 is arranged to reciprocate, the upper ends of these bars being pivotally connected on transverse axes 96 to yokes or lugs 97 which are pivotally mounted on longitudinal axes 98 on a frame cross member 99. Each sleeve 91 has a guide block 100 of generally arcuate form in the vertical transverse plane of the vehicle, these guide blocks having in their under-faces guide channels 101 in which engage arcuate flanges 102 connected rigidly to the upper axle arms or struts 81. By the described arrangement, the axle is free to move bodily in a vertical direction, or to tilt in its vertical plane and the guide blocks and flanges permit the tilting motions and at the same time prevent substantial rotary motion of the axle and bodily shifting of the frame longitudinally in relation to the axle. At its forward end, the axle frame is guided in relation to the main frame, as follows: Guide rods 103 are pivotally mounted on longitudinal axes 104 on the axle frame members 85. Each of the guide rods slides in a guide sleeve 105, the upper end of which is pivotally connected on a longitudinal axis to a yoke or lug 106 mounted in the frame bracket 107. The sleeves 105 are free to oscillate laterally in slots 108 in frame brackets 109 but are guided in such slots so that the main frame cannot move substantially in the longitudinal direction in relation to the axle frame. These guide devices therefore prevent lateral vibration or side sway of the body which ordinarily occurs when, for example, one end of the axle moves up and down at a certain rate due to road surface irregularities, this vibratory movement being converted into a longitudinal force and transmitted to the frame by one portion of the rear spring, which ordinarily is pivotally connected to the frame at a fixed point. In the present structure, however, each rear spring at its forward as well as its rear end is connected to the frame by a swinging shackle, and the frame is longitudinally stabilized in relation to the axle by the guide devices 91, 95, etc., 103, 105, etc., so that no longitudinal or lateral effect is produced upon the frame by dancing of the rear axle either at one or both ends.

The main frame is stabilized, that is, compelled to maintain its horizontal position, or parallelism to the road surface regardless of tilting of the rear axle (or of the front axle) in the vertical plane by means or mechanism controlled from the rear axle and acting substantially at the longitudinal center of the chassis, so that by such mechanism controlled by only one axle,—preferably the rear axle—the entire frame is stabilized in the desired manner.

Figure 14:
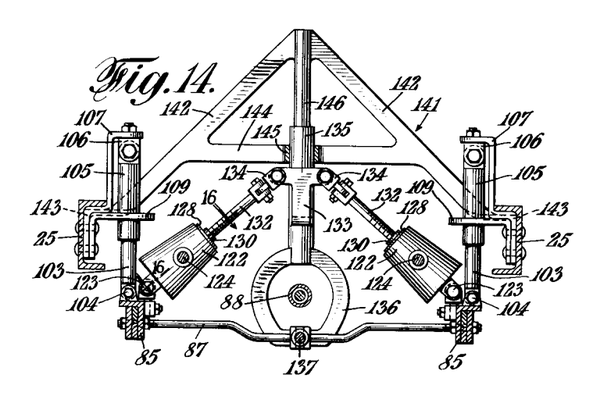
Fig. 14 is a section at 14—14, Fig. 1.

This mechanism includes square guide sleeves 110 pivotally connected on longitudinal axes to brackets 111 which are clamped on the rear springs just behind their mountings in the seats 71. In each sleeve, a rack bar 112 reciprocates. The upper end of each rack bar is pivotally connected on a longitudinal axis to a yoke 113 and the yoke is in turn connected on a transverse axis to a bracket 114 mounted on the adjacent side frame member 25. The articulated connections of the guide sleeves and rack bars provide for all of the movements of the chassis frame in relation to the axle. Each of the guide sleeves 110 has near its upper end a gear box 115 enclosing a short longitudinal shaft 116 on which is a pinion 117 engaging the corresponding rack bar 112. Parallel to shaft 116, there is also mounted in the gear box, a shaft 118 carrying a pinion 119 engaging pinion 117. The forward end of shaft 118 projects from the gear box and is connected by a universal joint 120 to a shaft 121 which extends diagonally forward to a point adjacent another gear box 122, one end of which (see Figs. 14 to 16) is pivotally mounted on a longitudinal axis 123 at the forward end of one of the axle frame members 85. A short shaft 124 is revolubly mounted on approximately longitudinal axis in one wall of this gear box and is connected at its rear end by a universal joint 125 to the front end of the corresponding shaft 121. The short shaft 124 carries within the gear box a gear 126 engaging a bevel pinion 127 revolubly mounted in an upper end plate 128 of the gear box. This pinion is mounted on or formed as a part of a sleeve 129 which is restrained from longitudinal movement of the gear box by shoulder and flange formations 130, 131 and is internally threaded to engage a screw 132 which extends through it and into the box. The gear boxes and screws 132 are inclined inward and upward as clearly shown in Figs. 9, 14 and 15, and the upper end of each screw is connected by a double linkage to a bracket 133 forming a part of a T-guide structure presently described. The articulated connection of each screw to the bracket includes a connection on a diagonal axis to a lug or link 134, the other end of which is pivotally connected on a longitudinal axis to the bracket. The screws are thus connected to a relatively fixed point on the chassis frame in such manner that they cannot rotate. Bracket 133 just referred to is connected to or formed as a part of a guide sleeve 135, the lower end of which is connected to or formed as a yoke or loop 136 surrounding and providing clearance for the propeller shaft 88 and this loop or yoke is connected at its lowest point by means of a pivotal and swivel connection 137 to a rod 138 extending forward from a bracket 139 at the center of cross bar 86. Sleeve 135 forms a part of a T-guide structure generally analogous to the T-guides at the front and rear as above described and serving to permit vertical movement of the chassis in relation to the sleeve, and the axle frame as a whole, while providing a relatively fixed point, namely, the bracket 133 for the articulated connection of the screws and acting in effect as an abutment so that the gearing commencing with the rack bars 112 near the rear of the frame may act on the screws to practically lengthen or shorten the link consisting of the corresponding screw 132 and gear box 122 between the axle frame and a central relatively fixed point, under control of the tilting of the axle, or vertical movement of the axle to any extent at either end or both ends simultaneously. The T-guide structure mentioned includes in addition to sleeve 135, a frame 141 having upwardly converging angular members 142, the ends of which are connected to the chassis frame side members at 143 and a cross bar 144 connecting the angular members near their lower ends. This cross bar has at its center a short guide sleeve 145 in which sleeve 135 reciprocates. Connected to the diagonal members at their meeting point is a vertical guide bar 146 extending downward and reciprocating in sleeve 135. The T-guide is thus guided with long bearing surfaces for vertical movement in relation to sleeve 135 and the upwardly extending T-structure also provides ample leverage effect to properly stabilize the chassis against lateral and unintentional tilting movements and also supports the sleeve 135 with its bracket 133 to act in effect as a non-rotative support for the screws 132 and also as an abutment for the stabilizing links, of which the screws form a part, as above stated.

Figure 13:
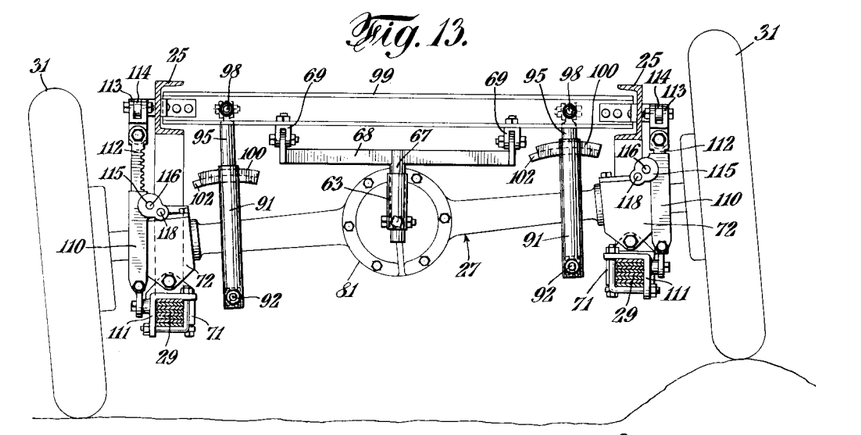
Fig. 13 is a similar view with the parts in another position.
Figure 15:
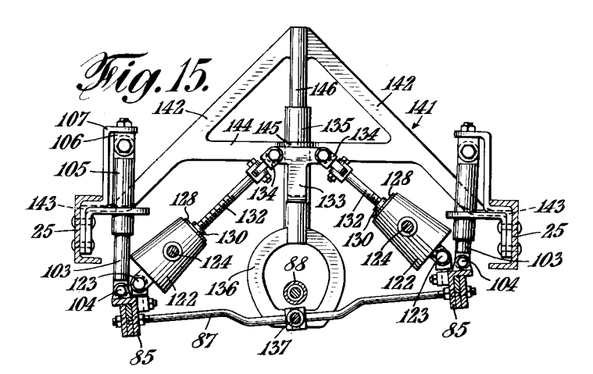
Fig. 15 is a similar view with the parts in another position.
Figure 16:
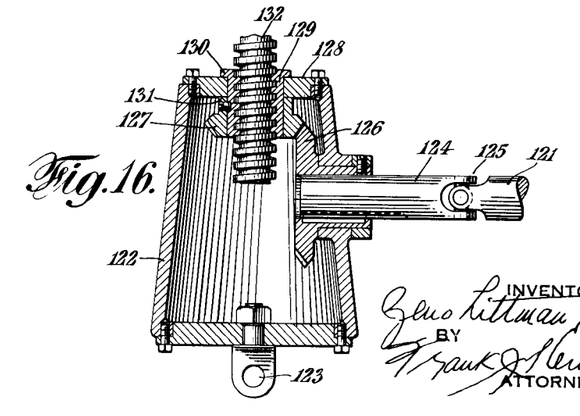
Fig. 16 is a detail section, enlarged, of part of the stabilizing linkage, at 16—16, Fig. 14.
Figure 17:
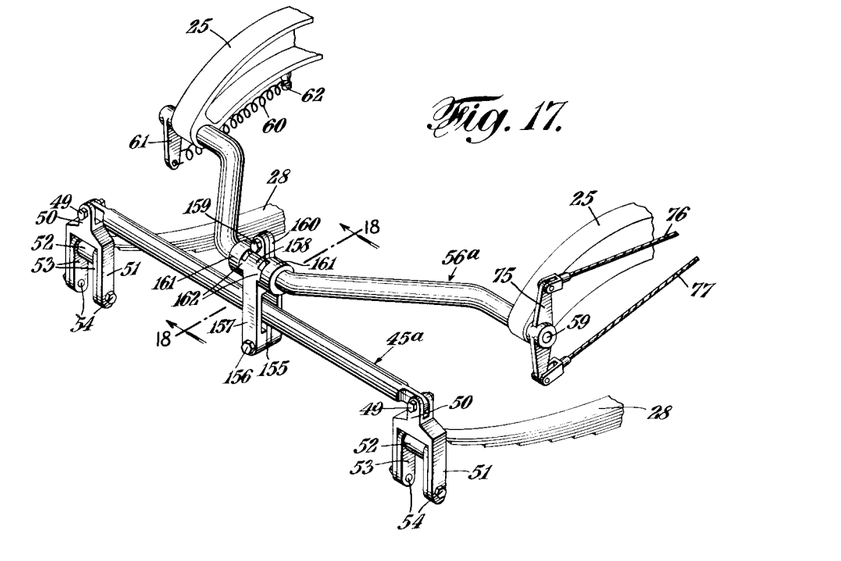
Fig. 17 is a view similar to Fig. 3, showing a modified chassis end suspension, or equalizing and spring shaft support arrangement.
Figure 18:
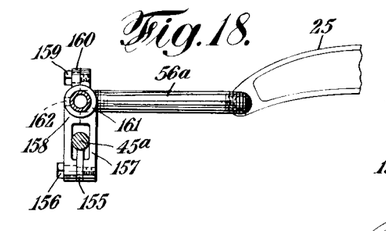
Fig. 18 is a section at 18—18, Fig. 17.
Figure 19:
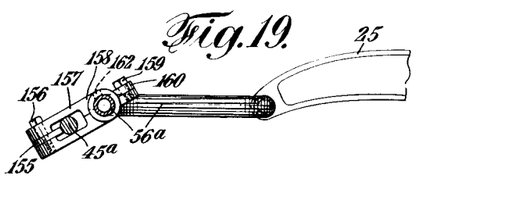
Fig. 19 is a similar view with the parts in another position.
Figure 20:
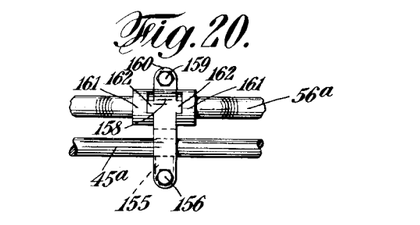
Fig. 20 is a detail in front elevation, of central parts of the spring shaft, equalizing bar and connecting linkage.

Whenever one end of the rear axle is tilted as shown in Fig. 13, the guide sleeve 110 at that side of the vehicle is raised in relation to its rack bar, and the gearing in box 115, and the corresponding shaft 121 is actuated in such manner that the link including the screw 132 and gear box 122 at the same side of the vehicle is operated in such manner as to in effect shorten that link, as shown in Fig. 15, in other words, the front end of the axle frame is adjusted in relation to the center guide structure and main frame to the same extent that the rear axle is tilted or in other words, the main frame is maintained in horizontal position assuming that the vehicle has previously been supported on a horizontal surface. In the same movement, the end of the axle adjacent the other wheel is raised to a slight extent and the equalizing gearing and link at that side of the vehicle are operated to a corresponding slight degree to slightly shorten the link at that side of the vehicle as also indicated in Fig. 15 in comparison with Fig. 14 so that the equalizing gearing takes care of upward movement of the axle in relation to the main frame at either or both ends simultaneously and in degree corresponding to the degree of tilting or upward movement of the axle. If both ends of the axle move upward simultaneously, both of the equalizing gearings and linkages are operated simultaneously so that the front end of the axle frame is raised to the same extent that the axle itself rises in relation to the main frame. It will now be understood that the frame is stabilized in respect to transverse horizontal position by means acting from or actuated by the rear axle, and tilting movements to the front axle are ineffective to disturb this transverse stability since I provide only equalizing mechanism intermediate the front axle and the frame.

It will also be understood that the action of the equalizing mechanism at both ends of the frame is such that when one end of an axle is raised, this movement is communicated to the frame only at the center of the corresponding equalizing bar 45. Without regard to deflection of the spring at the opposite side of the vehicle therefore, the frame will be lifted a distance equal to only one-half the lift of the axle end. This motion is however in the case of abrupt shocks still further reduced by the fact that when one end of the axle is raised, the equalizing bar tends to pivot at its connection 58 and to force down the front end of the opposite spring so that this spring deflection further reduces the total lift of the chassis frame.

The invention further provides in fullest degree for reduction of vertical movement of the chassis frame and body in the case of tilting of either axle, for horizontal stabilization of the frame, especially in the lateral direction, in case of tilting of either axle; for longitudinal equalization or stabilization of the frame in the case of vertical movement of either axle which is sufficient to rotate the transverse spring shafts 56; and for prevention of side sway or lateral dancing of the vehicle, especially at the rear end, in case of vibratory motions of the rear axle, by reason of the mode of mounting of the rear springs and the guide mechanisms 91, 95, etc., 103, 105, 109, etc. intermediate the chassis and the axle and axle frame.

Figure 9:
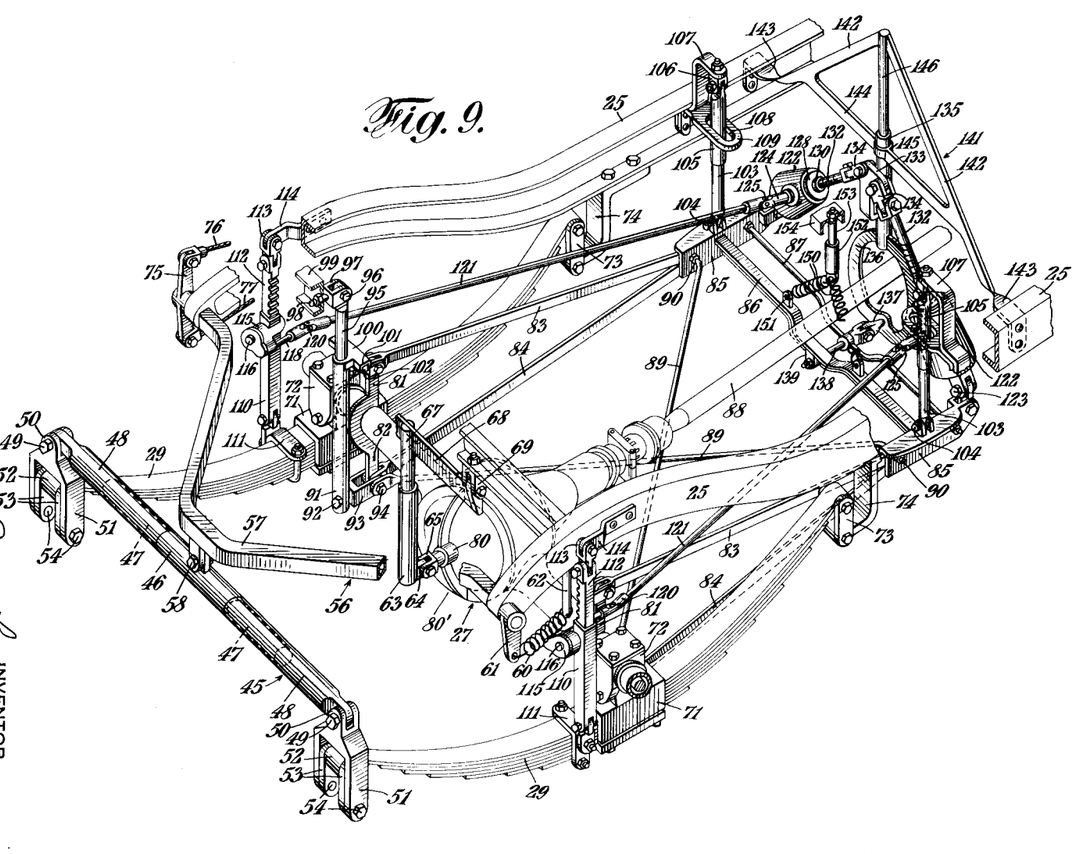
Fig. 9 is a perspective of the central and rear portions of the chassis, from a rear right viewpoint, with some parts broken away or in section.
Figure 10:
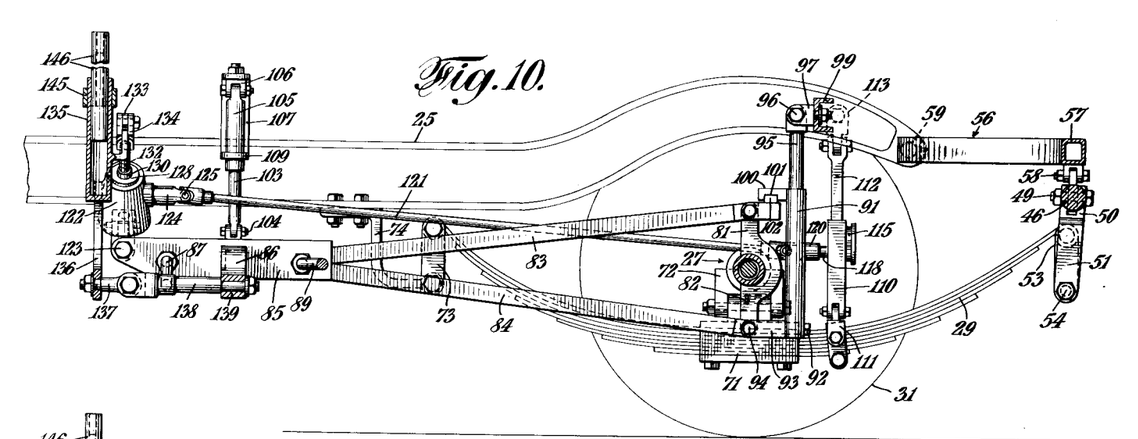
Fig. 10 is a section at 10—10, Fig. 1, enlarged.
Figure 11:
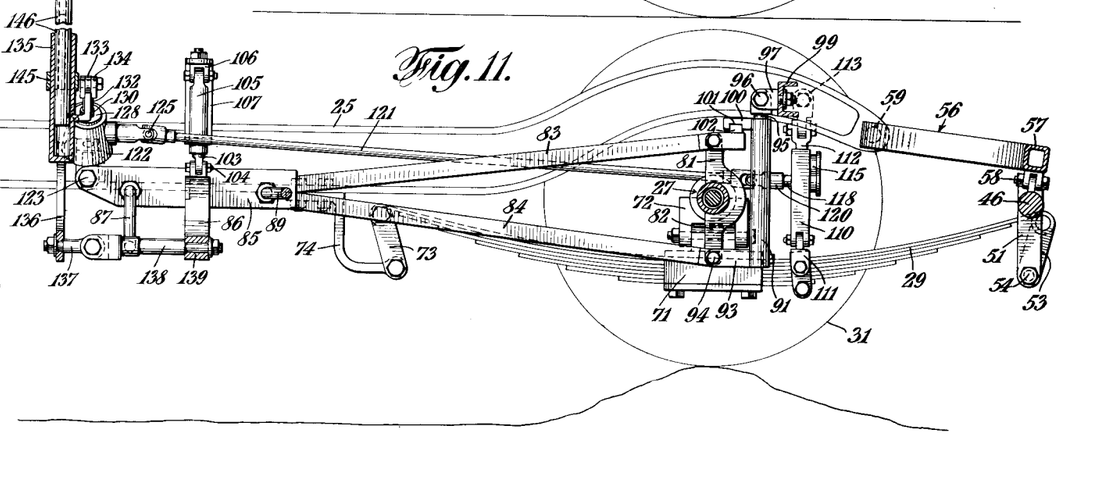
Fig. 11 is a similar view with the parts in another position.
Figure 12:
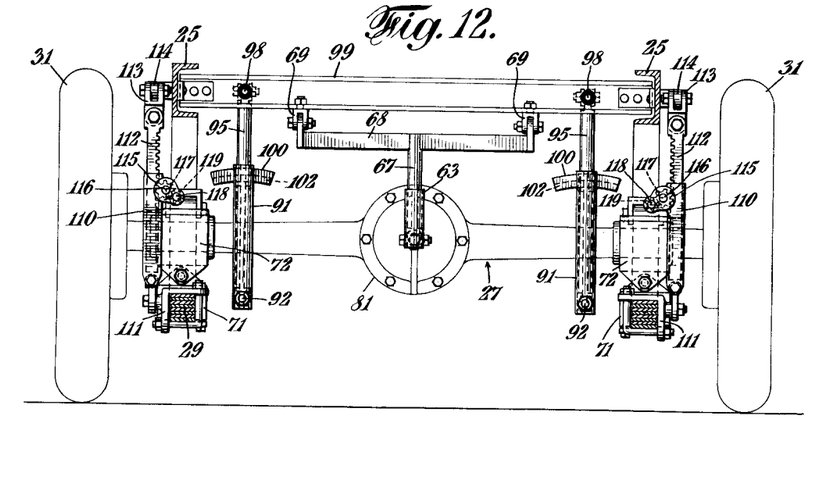
Fig. 12 is a rear elevation.

In some cases, it is desirable to provide means for supporting the weight of the front end of the axle frame. For this purpose, helical tension springs 150 may be connected to lugs 151 on cross bar 86 of the axle frame. These springs are arranged to straddle the propeller shaft and give ample clearance for it; they converge upwardly and are connected at a common point to the lower end of a sleeve 152 which slides on a rod 153 connected to the center of a transverse frame member 154, a portion of which is shown in Fig. 9. In the normal position of the main frame in relation to the axle frame, the springs support the weight of the front end of the latter. The downward movement of sleeve 152 may be limited by an internal flange cooperating with a flange on the rod. In case of any considerable upward movement of the axle frame, and accompanying closing up of the helical springs 150, sleeve 152 may rise on its rod, and thus any blocking of the axle frame movement is prevented.

Figs. 17 to 20 show a modification of the front or rear equalizing bar and spring shaft arrangement, and more particularly of the manner of connecting the equalizing bar to the spring shaft by an under-slung linkage and also providing stop means to limit the movement of the linkage in relation to the spring shaft, and thus in turn to limit movement of the spring shackle forks 51 and links 53 in such manner as to prevent reversal of the main springs 28 or 29. In this modified arrangement the equalizing bar 45a may be made solid, that is without relatively rotary center and end portions. The bar has at its center a depending lug 155, pivotally connected on a longitudinal axis 156 to the lower ends of the arms of a fork 157, these arms embracing the equalizing bar and being provided on their upper ends with half-sleeves or bearings 158 embracing the center portion of the spring shaft 56a which in this case may be of round section. The sleeves or half-bearings 158 are held in oscillating engagement with the shaft by a screw 159 passing through ears 160, in corporation with the screw 156 which provides the pivot bearing in lug 155. Rigidly fixed on the spring shaft at each side of the bearing sleeve 158 are collars 161, and the collars and the bearing sleeve have cooperating lug and slot formations 162 affording a limited travel or oscillating movement of the fork consisting of arms 157 in relation to shaft 56a; thus in an extreme movement of the axle, the equalizing bar 45a and the fork 157 are swung to the position shown in Fig. 19 and the movement is then limited by lugs 162 engaging the upward ends of the slots in the collars 161, preventing reversal of the main springs; and any further movement of the axle is taken care of by rotation of shaft 56a in its bearings under control of spring 60.

I claim:

1. In a motor vehicle, in combination with the chassis frame, an axle and springs, an equalizing bar adapted to move arcuately about a transverse axis with respect to the frame, said bar being pivoted at its midsection along a longitudinal axis, and having end portions revolubly mounted with respect to the midsection, and link connections between the ends of the bar and corresponding ends of the springs, said link connections each including a yoke pivotally connected to the equalizing bar on a longitudinal axis.

2. In a motor vehicle, in combination with the chassis frame, an axle and springs, an equalizing bar having end portions revolubly mounted in relation to a central portion, a pivotal connection on a longitudinal axis between the center of the equalizing bar and the frame, and link connections between the ends of the bar and corresponding ends of the springs, said link connections each including a yoke pivotally connected to the equalizing bar on a longitudinal axis, the yoke having depending arms straddling the spring and extending below it, and shackle links connecting the ends of the yoke arms to the spring eye.

3. The combination with a chassis frame, axle and springs, of a transverse equalizing bar connected to corresponding ends of the springs, a rock shaft pivotally mounted on the frame and forwardly bowed at its center, and a longitudinal pivotal connection between the bowed portion of the rock shaft and the center of the equalizing bar.

4. The combination with a chassis frame, axle and springs, of a transverse equalizing bar connected to corresponding ends of the springs, a rock shaft pivotally mounted on the frame and forwardly bowed at its center, and a longitudinal pivotal connection between the bowed portion of the rock shaft and the center of the equalizing bar, and spring means normally acting between the rock shaft and the frame to yieldingly support the frame on the equalizing bar.

5. In a motor vehicle, in combination with the main frame, front and rear axles, front and rear springs, and equalizing bars connecting corresponding ends of each pair of springs, a rock shaft on each end of the chassis frame and connected to the center of the corresponding equalizing bar, spring means normally acting on the rock shafts to support the frame on the equalizing bars, and at one side of the frame connections between the rock shafts acting when one of them rotates to cause the other to rotate in such direction as to maintain the longitudinal level of the frame.

6. In a motor vehicle, in combination with the main frame, front and rear axles, front and rear springs, and equalizing bars connecting corresponding ends of each pair of springs, a rock shaft on each end of the chassis frame and connected to the center of the corresponding equalizing bar, spring means normally acting on the rock shafts to support the frame on the equalizing bars, and at one side of the frame cable connections between the rock shafts acting when one of them rotates to cause the other to rotate in such direction as to maintain the longitudinal level of the frame.

7. In a motor vehicle, in combination with the chassis frame, axles and springs, transverse frame stabilizing mechanism acting between the axle and the frame and including for each end of the axle gearing actuated by vertical movement of the axle, a shaft extending toward the center of the chassis, a diagonal link, and means for lengthening and shortening the link in accordance with axle tilting.

8. In a motor vehicle, in combination with the chassis frame, axles and springs, transverse frame stabilizing mechanism acting between the axle and the frame and including for each end of the axle gearing actuated by vertical movement of the axle, a shaft extending toward the center of the chassis, a diagonal link, and gearing for lengthening and shortening the link in accordance with axle tilting.

9. In a motor vehicle, in combination with the chassis frame, axles and springs, an axle frame extending toward the center of the chassis, links connecting opposite sides of the axle frame operatively to the chassis frame, and means actuated by vertical movement of the axle and independently for each end thereof to effectively lengthen or shorten the corresponding link to a degree proportional to axle movement.

10. In a motor vehicle, in combination with the chassis frame, axles and springs, an axle frame extending toward the center of the chassis, links connecting opposite sides of the axle frame operatively to the chassis frame, and means actuated by vertical movement of the axle and independently for each end thereof to effectively lengthen or shorten the corresponding link to a degree proportional to axle movement, said links comprising screws, the revoluble nuts on the screws, and gears for rotating the nuts.

11. In a motor vehicle, in combination with the chassis frame, axles and springs, an axle frame extending toward the center of the chassis, links connecting opposite sides of the axle frame operatively to the chassis frame, and mechanism intermediate the axle and frame and comprising for each end of the axle a relatively movable sleeve and rack bar, a gear engaging the rack bar, and a shaft connection from the gear to the corresponding stabilizing link.

12. In a motor vehicle, in combination with the main frame, axles, springs, and equalizing mechanism, a T-guide structure comprising a sleeve connected to an axle, a guide bar reciprocating in the sleeve, and a cross bar connected to the guide bar and pivotally connected at its ends to the main frame cross member.

13. In a motor vehicle, in combination with the main frame. axles, springs, and equalizing mechanism, an axle frame extending from an axle toward the center of the chassis, a T-guide structure for the axle frame comprising a sleeve connected thereto, a T-frame connected to the main frame, and a vertical guide bar in the T-frame and reciprocating in the sleeve.

14. In a motor vehicle, in combination with the main frame, axles, springs, and equalizing mechanism, an axle frame extending from an axle toward the center of the chassis, a T-guide structure for the axle frame comprising a sleeve connected thereto, a T-frame connected to the main frame, and a vertical guide bar in the T-frame and reciprocating in the sleeve, the sleeve having at its lower end a yoke formation accommodating the propeller shaft and connected at a lower point to a cross member of the axle frame.

15. In a motor vehicle, in combination with the main frame, axles, springs, and equalizing mechanism, an axle frame extending from an axle toward the center of the chassis, a T-guide structure for the axle frame comprising a sleeve connected thereto, a T-frame connected to the main frame, and a vertical guide bar in the T-frame and reciprocating in the sleeve, and means supporting the end of the axle frame in relation to the main frame.

16. In a motor vehicle, in combination with the main frame, axles, springs, and equalizing mechanism, an axle frame extending from an axle toward the center of the chassis, a T-guide structure for the axle frame comprising a sleeve connected thereto, a T-frame connected to the main frame, and a vertical guide bar in the T-frame and reciprocating in the sleeve, and means stabilizing the main frame in longitudinal directions in relation to the axle and axle frame.

17. In a motor vehicle, in combination with the chassis frame, axle and springs, stabilizing mechanism acting independently between the ends of an axle and the frame at a substantially central point thereof to maintain the horizontal level of the frame during upward movement of either end of an axle, the rear springs having shackle connections at each end to the frame and generally vertical guide means permitting axle tilting and comprising sleeves operatively connected to the axle, and guide rods sliding therein and connected to a frame cross member.

ZENO LITTMAN.